US012080308B2

(12) United States Patent
Koppens et al.

(10) Patent No.: US 12,080,308 B2
(45) **Date of Patent: *Sep. 3, 2024**

(54) TRANSMISSION-AGNOSTIC PRESENTATION-BASED PROGRAM LOUDNESS

(71) Applicants: DOLBY LABORATORIES LICENSING CORPORATION, San Francisco, CA (US); DOLBY INTERNATIONAL AB, Amsterdam Zuidoost (NL)

(72) Inventors: Jeroen Koppens, Nederweert (NL); Scott Gregory Norcross, San Rafael, CA (US)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 553 days.

This patent is subject to a terminal disclaimer.

(21) Appl. No.: 17/372,295

(22) Filed: Jul. 9, 2021

(65) Prior Publication Data

US 2022/0005489 A1 Jan. 6, 2022

Related U.S. Application Data

(60) Continuation of application No. 16/790,352, filed on Feb. 13, 2020, now Pat. No. 11,062,721, which is a (Continued)

(51) Int. Cl.
*G10L 19/00* (2013.01)
*G10L 19/16* (2013.01)
(Continued)

(52) U.S. Cl.
CPC ............ *G10L 19/167* (2013.01); *G10L 19/24* (2013.01); *G10L 21/034* (2013.01)

(58) Field of Classification Search
CPC ..... G10L 19/008; G10L 19/167; G10L 19/22; G10L 19/00; G10L 21/034; G10L 25/21;
(Continued)

(56) References Cited

U.S. PATENT DOCUMENTS 7,072,477 B1 7/2006 Kincaid
7,369,906 B2 5/2008 Frindle
(Continued)

FOREIGN PATENT DOCUMENTS

CN 101410892 4/2009
CN 101432965 5/2009
(Continued)

OTHER PUBLICATIONS

S. Lyman and C. Todd, "Digital Audio Delivery to the Consumer," in SMPTE Journal, vol. 109, No. 4, pp. 301-308, Apr. 2000, doi: 10.5594/J05366. (Year: 2000).*
(Continued)

*Primary Examiner* — Edgar X Guerra-Erazo

(57) ABSTRACT

This disclosure falls into the field of audio coding, in particular it is related to the field of providing a framework for providing loudness consistency among differing audio output signals. In particular, the disclosure relates to methods, computer program products and apparatus for encoding and decoding of audio data bitstreams in order to attain a desired loudness level of an output audio signal.

15 Claims, 3 Drawing Sheets

Related U.S. Application Data continuation of application No. 15/677,919, filed on Aug. 15, 2017, now Pat. No. 10,566,005, which is a division of application No. 15/517,482, filed as application No. PCT/US2015/054264 on Oct. 6, 2015, now Pat. No. 10,453,467.

(60) Provisional application No. 62/062,479, filed on Oct. 10, 2014.

(51) Int. Cl.
*G10L 19/24* (2013.01)
*G10L 21/034* (2013.01)

(58) Field of Classification Search
CPC ............... G10L 19/083; G10L 21/0205; G10L 21/0224; G10L 21/0316
See application file for complete search history.

(56) References Cited

U.S. PATENT DOCUMENTS

| | | | |
|---|---|---|---|
| 7,502,743 | B2 | 3/2009 | Thumpudi |
| 7,551,745 | B2 | 6/2009 | Gundry |
| 7,617,109 | B2 | 11/2009 | Smithers |
| 7,729,673 | B2 | 6/2010 | Romesburg |
| 7,755,526 | B2 * | 7/2010 | Medina .............. H04N 21/2335 341/120 |
| 7,822,498 | B2 | 10/2010 | Charoenruengkit |
| 7,860,720 | B2 | 12/2010 | Thumpudi |
| 8,032,385 | B2 | 10/2011 | Smithers |
| 8,069,050 | B2 | 11/2011 | Thumpudi |
| 8,099,292 | B2 | 1/2012 | Thumpudi |
| 8,131,134 | B2 | 3/2012 | Sirivara |
| 8,144,881 | B2 | 3/2012 | Crockett |
| 8,213,624 | B2 | 7/2012 | Seefeldt |
| 8,242,942 | B2 * | 8/2012 | Medina ................ H03G 3/3005 341/122 |
| 8,255,230 | B2 | 8/2012 | Thumpudi |
| 8,280,063 | B2 | 10/2012 | Schmidt |
| 8,315,396 | B2 | 11/2012 | Schreiner |
| 8,386,269 | B2 | 2/2013 | Thumpudi |
| 8,428,758 | B2 | 4/2013 | Naik |
| 8,554,569 | B2 | 10/2013 | Chen |
| 8,620,674 | B2 | 12/2013 | Thumpudi |
| 8,781,820 | B2 | 7/2014 | Seguin |
| 8,818,798 | B2 | 8/2014 | Beerends |
| 8,861,927 | B2 | 10/2014 | Sirivara |
| 8,903,098 | B2 | 12/2014 | Tsuji |
| 8,965,774 | B2 | 2/2015 | Eppolito |
| 8,989,884 | B2 | 3/2015 | Guetta |
| 9,154,102 | B2 | 10/2015 | Wolters |
| 9,240,763 | B2 | 1/2016 | Baumgarte |
| 9,294,062 | B2 | 3/2016 | Hatanaka |
| 9,300,268 | B2 | 3/2016 | Chen |
| 9,542,952 | B2 | 1/2017 | Hatanaka |
| 9,576,585 | B2 | 2/2017 | Bleidt |
| 9,608,588 | B2 | 3/2017 | Baumgarte |
| 9,633,663 | B2 | 4/2017 | Heuberger |
| 9,830,915 | B2 | 11/2017 | Schreiner |
| 9,836,272 | B2 | 12/2017 | Kono et al. |
| 10,453,467 | B2 | 10/2019 | Koppens |
| 10,566,005 | B2 | 2/2020 | Koppens |
| 2004/0044525 | A1 | 3/2004 | Vinton |
| 2004/0049379 | A1 | 3/2004 | Thumpudi |
| 2005/0078840 | A1 | 4/2005 | Riedl |
| 2005/0234731 | A1 | 10/2005 | Sirivara |
| 2006/0002572 | A1 | 1/2006 | Smithers |
| 2008/0025530 | A1 | 1/2008 | Romesburg |
| 2008/0267414 | A1 | 10/2008 | Mukaide |
| 2009/0063159 | A1 | 3/2009 | Crockett |
| 2009/0067644 | A1 | 3/2009 | Crockett |
| 2010/0109926 | A1 * | 5/2010 | Medina ................ H03G 3/3005 386/338 |
| 2010/0135507 | A1 | 6/2010 | Kino |
| 2010/0241258 | A1 * | 9/2010 | Medina ................ H03G 3/3089 700/94 |
| 2011/0054916 | A1 | 3/2011 | Thumpudi |
| 2012/0082316 | A1 | 4/2012 | Thumpudi |
| 2012/0087504 | A1 | 4/2012 | Thumpudi |
| 2012/0130721 | A1 | 5/2012 | Sirivara |
| 2012/0201386 | A1 | 8/2012 | Riedmiller et al. |
| 2012/0219066 | A1 | 8/2012 | Amonou et al. |
| 2012/0275625 | A1 | 11/2012 | Kono |
| 2013/0015801 | A1 | 1/2013 | Ady |
| 2013/0094669 | A1 | 4/2013 | Kono |
| 2013/0117270 | A1 | 5/2013 | Sullivan |
| 2013/0144630 | A1 | 6/2013 | Thumpudi |
| 2013/0170672 | A1 | 7/2013 | Groeschel |
| 2013/0208918 | A1 | 8/2013 | Nandury |
| 2013/0226596 | A1 | 8/2013 | Geiger |
| 2014/0025386 | A1 | 1/2014 | Xiang |
| 2014/0140537 | A1 | 5/2014 | Soulodre |
| 2014/0211946 | A1 | 7/2014 | Seefeldt |
| 2014/0257799 | A1 | 9/2014 | Shepard |
| 2016/0225376 | A1 | 8/2016 | Honma |
| 2016/0315722 | A1 | 10/2016 | Holman |
| 2016/0351202 | A1 | 12/2016 | Baumgarte |
| 2017/0092280 | A1 | 3/2017 | Hirabayashi |
| 2017/0223429 | A1 | 8/2017 | Schreiner |

FOREIGN PATENT DOCUMENTS

| | | | |
|---|---|---|---|
| CN | 102017402 | | 4/2011 |
| CN | 102195584 | | 9/2011 |
| CN | 102725791 | | 10/2012 |
| CN | 103098017 | B | 5/2016 |
| CN | 107112023 | B | 10/2020 |
| DE | 202013006242 | U1 | 8/2013 |
| EP | 0742674 | B1 | 4/2014 |
| EP | 3089161 | | 11/2016 |
| JP | H10-187190 | | 7/1998 |
| JP | 2001242897 | | 9/2001 |
| JP | 2006524968 | | 11/2006 |
| JP | 2008197199 | | 8/2008 |
| JP | 2011510589 | | 3/2011 |
| JP | 2013519918 | | 5/2013 |
| JP | 2013157659 | | 8/2013 |
| JP | 2013541275 | | 11/2013 |
| JP | 2013543599 | | 12/2013 |
| WO | 2011131732 | | 10/2011 |
| WO | 2012026092 | | 3/2012 |
| WO | 2012075246 | A2 | 6/2012 |
| WO | 2014035864 | | 3/2014 |
| WO | 2014111290 | | 7/2014 |
| WO | 2014111308 | | 7/2014 |
| WO | 2014113465 | A1 | 7/2014 |
| WO | 2014113471 | | 7/2014 |
| WO | 2014124377 | | 8/2014 |
| WO | 2014160849 | | 10/2014 |
| WO | 2014160895 | | 10/2014 |
| WO | 2015059087 | | 4/2015 |
| WO | 2015088697 | | 6/2015 |
| WO | 2015144587 | | 10/2015 |
| WO | 2015148046 | | 10/2015 |
| WO | 2016075053 | | 5/2016 |
| WO | 2016193033 | | 12/2016 |
| WO | 2016202682 | | 12/2016 |
| WO | 2017023423 | | 2/2017 |
| WO | 2017023601 | | 2/2017 |
| WO | 2017058731 | | 4/2017 |
| WO | 2016002738 | | 5/2017 |

OTHER PUBLICATIONS

S. Lyman and C. Todd, "Dolby Digital Audio Delivery to the Consumer," 9th Conference and Exhibition of the SMPTE Australia Section, Sydney, NSW, Australia, 1999, pp. 106-117, doi: 10.5594/M001175. (Year: 1999).*

"Digital Audio Compression (AC-4) Standard Part 2: Immersive and Personalized Audio ETSI TS 103 190-2" No. V1, Jul. 10, 2015, pp. 1-195.

(56) References Cited

OTHER PUBLICATIONS

"Digital Audio Compression (AC-4) Standard" Apr. 1, 2014, pp. 1-295.
108th MPEG Valencia, Spain, Mar. 31-Apr. 4, 2014, Meeting Report Panos Kudumakis qMedia, Queen Mary, University of London 2 https://code.soundsoftware.ac.uk/attachments/download/1119/1 Panos Valencia108MPEGMeetingReport.pdf (visited Mar. 18, 2018).
109th MPEG Sapporo, Japan, Jul. 7-11, 2014, Meeting Report Panos Kudumakis qMedia, Queen Mary University of London https://code.soundsoftware.ac.uk/attachments/download/1217/2PanosSapporo109MPEGMeetingReport.pdf (visited Mar. 19, 2018).
ATSC Recommended Practice: Techniques for Establishing and Maintaining Audio Loudness for Digital Television (A/85:2013) Doc. A/85:2013, Mar. 12, 2013.
Baumgarte, F. et al List of Proposed Text Modifications for MPEG-D Dynamic Range Control (23003-4), ISO/IEC JTC1/SC29/WG11 MPEG2014/M34092 Jul. 2014, Sapporo, Japan.
Baumgarte, F. et al "Proposed DIS Text of 23003-4 MPEG-D DRC" ISO/IEC JTC1/SC29/WG11 MPEG4/M34091, Jul. 2014, Sapporo, Japan.
Baumgarte, F. et al "Working Draft 0 on Dynamic Range Control" ISO/IEC JTC1/SC29/WG11 MPEG4/M32271, Jan. 2014, San Jose, CA USA.
EBU R 128 "Loudness Normalisation and Permitted Maximum Level of Audio Signals" EBU Recommendation, Geneva, Jun. 2014.
ISO/IEC JTC 1/SC 29/WG 11, "Information Technology—MPEG Audio Technologies—Part 4: Dynamic Range Control" 2014.
ISO/IEC JTC1/SC29/WG11 N15071 "White Paper on MPEG-D Dynamic Range Control" Feb. 2015, Geneva, Switzerland.
ISO/IEC WD 2300X-X:2014(e), ISO/IEC JTC 1/SC 29/WG 11, "Information technology—MPEG audio Technologies—Part 4: Dynamic Range Control".
ITU-R, Recommendation ITU-R BS.1770-3 "Algorithms to Measure Audio Programme Loudness and True-Peak Audio Level" Aug. 2012.
Kratschmer, M. et al "External Interface to DRC Tool in MPEG-D DRC and MPEG-H" ISO/IEC JTC1/SC29/WG11 MPEG2014/M34213, Jul. 2014, Sapporo, Japan.
Kratschmer, M. et al "On GroupPreset Metadata" MPEG Meeting Jul. 7-11, 2014, ISO/IEC JTC1 SC29/WG11.
Kratschmer, M. et al "Proposed Text on DRC and Loudness Technology in MPEG-H 3D Audio" ISO/IEC JTC1/SC29/WG11 MPEG2014/ M33151, Mar. 2014, Valencia, Spain.
Kratschmer, M. et al "Technical Description of a Tool for DRC Technology" ISO/IEC JTC1/SC29/WG11 MPEG2014/ M33149, Mar. 2014, Valencia, Spain.
Kudumakis—107th MPEG San Jose (CA), USA, Jan. 13-17, 2014, Meeting Report Panos Kudumakis qMedia, Queen Mary University of London (7 pgs.).
Quackenbush, S. et al "Report of AhG on 3D Audio Phase, DRC and Audio Maintenance" ISO/IEC JTC1/SC29/WG11 MPEG2014/M33569, Jul. 2014, Sapporo, JP.
Kuech, F. et al "Dynamic Range and Loudness Control in MPEG-H 3D Audio" presented at the 139th Convention, Oct. 29-Nov. 1, 2015, New York, USA.
Meier, M. et al "Core Experiment on Improving MPEG-D DRC Technology" ISO/IEC JTC1/SC29/WG11 MPEG2014/M33147 Mar./Apr. 2014, Valencia, Spain.
Meier, M. et al "DRC Example Bitstreams for MPEG-H" ISO/IEC JTC1/SC29/WG11 MPEG2014/M34214, Jul. 2014, Sapporo, Japan.
Neugebauer, B. et al "Core Experiment on Redundancy Reduction in MPEG-D DRC Gain Sequence Coding" ISO/IEC JTC1/SC29/WG11 MPEG2014/M33142 Mar./Apr. 2014, Valencia, Spain.
Vickers, E. "Automatic Long-Term Loudness and Dynamics Matching" Audio Engineering society Convention, Sep. 21-24, 2001, pp. 1-11.
Neugebauer, B. et al "Core Experiment on Low-Bitrate Gain Sequence Coding for MPEG-D DRC" ISO/IEC JTC1/SC29/WG11 MPEG2014/M33145, Mar./Apr. 2014, Valencia, Spain.

* cited by examiner

TRANSMISSION-AGNOSTIC PRESENTATION-BASED PROGRAM LOUDNESS

CROSS REFERENCE TO RELATED APPLICATIONS

This application is a continuation of U.S. patent application Ser. No. 16/790,352, filed Feb. 13, 2020, which is a continuation of Ser. No. 15/677,919, filed on Aug. 15, 2017, (now U.S. Pat. No. 10,566,005) which is a divisional of U.S. patent application Ser. No. 15/517,482, filed on Apr. 6, 2017 (now U.S. Pat. No. 10,453,467), which is the U.S. national stage of International Patent Application No. PCT/US2015/054264, filed on Oct. 6, 2015, which in turn claims priority to U.S. Provisional Patent Application No. 62/062,479, filed on Oct. 10, 2014, each of which is hereby incorporated by reference in its entirety.

TECHNICAL FIELD

The invention pertains to audio signal processing, and more particularly, to encoding and decoding of audio data bitstreams in order to attain a desired loudness level of an output audio signal.

BACKGROUND ART

Dolby AC-4 is an audio format for distributing rich media content efficiently. AC-4 provides a flexible framework to broadcasters and content producers to distribute and encode content in an efficient way. Content can be distributed over a number of substreams, for example, M&E (Music and effects) in one substream and dialog in a second substream. For some audio content, it may be advantageous to e.g. switch the language of the dialog from one language to another language, or to be able to add e.g. a commentary substream to the content or an additional substream comprising description for vision-impaired.

In order to ensure a proper leveling of the content presented to the consumer, the loudness of the content needs to be known with some degree of accuracy. Current loudness requirements have tolerances of 2 dB (ATSC N85), 0.5 dB (EBU R128) while some specifications have tolerances as low as 0.1 dB. This means that the loudness of an output audio signal with a commentary track and with dialog in a first language should be substantially the same as the loudness of an output audio signal without the commentary track and with dialog in a second language.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
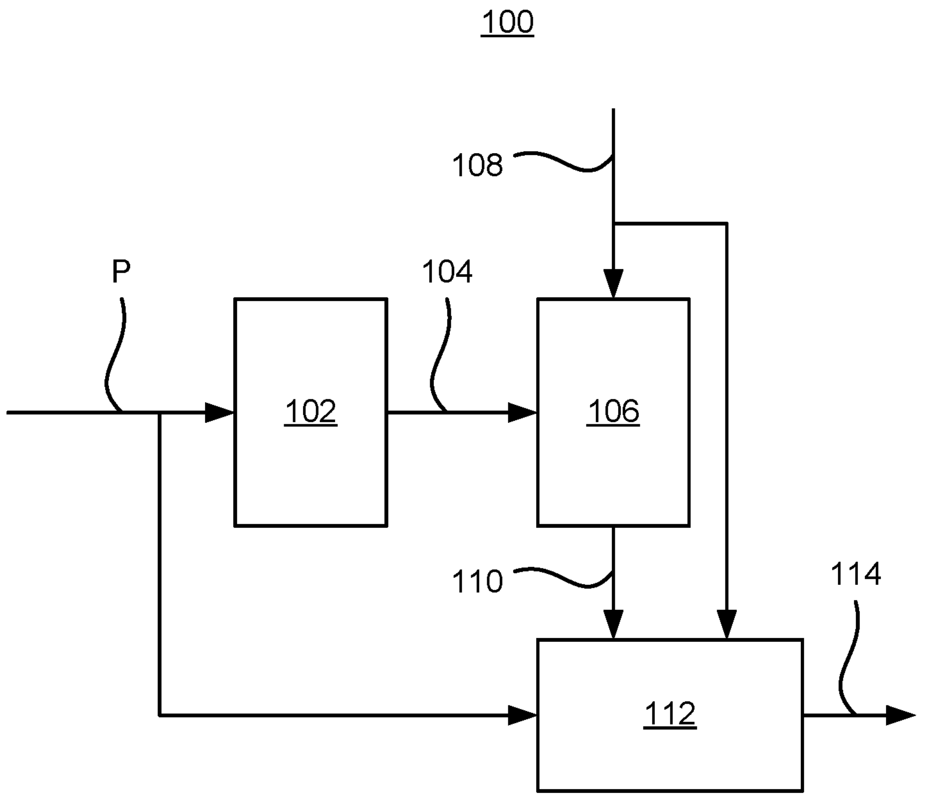
FIG. 1 is a generalized block diagram showing, by way of example, a decoder for processing a bitstream and attaining a desired loudness level of an output audio signal.

In view of the above, an objective is to provide encoders and decoders and associated methods aiming at providing a desired loudness level for an output audio signal independently of what content substreams are mixed into the output audio signal.

I. Overview—Decoder

According to a first aspect, example embodiments propose decoding methods, decoders, and computer program products for decoding. The proposed methods, decoders and computer program products may generally have the same features and advantages.

According to example embodiments there is provided a method of processing a bitstream comprising a plurality of content substreams, each representing an audio signal, the method including: from the bitstream, extracting one or more presentation data structures, each comprising a reference to at least one of said content substreams, each presentation data structure further comprising a reference to a metadata substream representing loudness data descriptive of the combination of the referenced one or more content substreams; receiving data indicating a selected presentation data structure out of said one or more presentation data structures, and a desired loudness level; decoding the one or more content substreams referenced by the selected presentation data structure; and forming an output audio signal on the basis of the decoded content substreams, the method further including processing the decoded one or more content substreams or the output audio signal to attain said desired loudness level on the basis of the loudness data referenced by the selected presentation data structure.

The data indicating a selected presentation data structure and a desired loudness level is typically a user-setting available at the decoder. A user may for example use a remote control for selecting a presentation data structure wherein the dialog is in French, and/or increase or decrease the desired output loudness level. In many embodiments the output loudness level is related to the capacities of the playback device. According to some embodiments, the output loudness level is controlled by the volume. Consequently, the data indicating a selected presentation data structure and the desired loudness value is typically not included in the bitstream received by the decoder.

As used herein "loudness" represents a modeled psychoacoustic measurement of sound intensity; in other words, loudness represents an approximation of the volume of a sound or sounds as perceived by the average user.

As used herein "loudness data" refers to data resulting from a measurement of the loudness level of a specific presentation data structure by a function modeling psychoacoustic loudness perception. In other words, it is a collection of values that indicates loudness properties of the combination of the referenced one or more content substreams. According to embodiments, the average loudness level of the combination of the one or more content substreams referred to by the specific presentation data structure can be measured. For example, the loudness data may refer to a dialnorm value (according to the ITU-R BS.1770 reccomendations) of the one or more content substreams referred to by the specific presentation data structure. Other suitable loudness measurements standards may be used such as Glasberg's and Moore's loudness model which provides modifications and extensions to Zwicker's loudness model.

As used herein "presentation data structure" refers to a metadata relating to the content of an output audio signal. The output audio signal will also be referred to as a "program". The presentation data structure will also be referred to as a "presentation".

Audio content can be distributed over a number of substreams. As used herein "content substream" refers to such substreams. For example, a content substream may comprise the music of the audio content, the dialog of the audio content or a commentary track to be included in the output audio signal. A content substream may be either channel-based or object-based. In the latter case, time-dependent spatial position data are included in the content substream. The content substream may be comprised in a bitstream or be a part of the audio signal (i.e. as a channel group or an object group)

As used herein "output audio signal" refers to the actually outputted audio signal which will be rendered to the user.

The inventors have realized that by providing loudness data for each presentation, e.g. a dialnorm value, specific loudness data are available to the decoder that indicates exactly what the loudness is for the referred at least one content substreams when decoding that specific presentation.

In prior art, loudness data may be provided for each content substream. The problem with providing loudness data for each content substream is that it in that case is up to the decoder to combine the various loudness data into a presentation loudness. Adding the individual loudness data values of the substreams, which represent the average loudnesses of the substreams, to arrive at a loudness value for a certain presentation may not be accurate, and will in many cases not result in the actual average loudness value of the combined substreams. Adding the loudness data for each referred content substream may be mathematically impossible due to the signal properties, the loudness algorithm and the nature of loudness perception, which is typically is non-additive, and could result in potential inaccuracies that are larger than the tolerances indicated above.

Using the present embodiment, the difference between the average loudness level of the selected presentation, provided by the loudness data for the selected presentation, and the desired loudness level thus may be used to control playback gain of the output audio signal.

By providing and using loudness data as described above, a consistent loudness may be achieved, i.e. a loudness that is close to the desired loudness level, between different presentations. Furthermore, a consistent loudness may be achieved between different programs on a TV-channel, for example between a TV-show and its commercial breaks, and also across TV channels.

According to example embodiments, wherein the selected presentation data structure references two or more content substreams, and further references at least two mixing coefficient to be applied to these, said forming an output audio signal further comprising additively mixing the decoded one or more content substreams by applying the mixing coefficient(s).

By providing at least two mixing coefficients, an increased flexibility of the content of the output audio signal is achieved.

For example, the selected presentation data structure may reference, for each substream of the two or more content substreams, one mixing coefficient to be applied to the respective substreams. According to this embodiment, relative loudness levels between the content substreams may be changed. For example, cultural preferences may require different balances between the different content substreams. Consider the situation where the Spanish regions want less attention to the music. Therefore, the music substream is attenuated by 3 dB. According to other embodiments, a single mixing coefficient may be applied to a subset of the two or more content substreams.

According to example embodiments, the bitstream comprises a plurality of time frames, and wherein mixing coefficients referenced by the selected presentation data structure are independently assignable for each time frame. An effect of providing time-varying mixing coefficients is that ducking may be achieved. For example, the loudness level for a time segment of one content substream may be reduced by an increased loudness in the same time segment of another content substream.

According to example embodiments, the loudness data represent values of a loudness function relating to the application of gating to its audio input signal.

The audio input signal is the signal on an encoder side to which the loudness function (i.e. the dialnorm function) was applied. The resulting loudness data is then transmitted to the decoder in the bitstream. A noise gate (also referred to as a silence gate) is an electronic device or software that is used to control the volume of an audio signal. Gating is the use of such a gate. Noise gates attenuate signals that register below a threshold. Noise gates may attenuate signals by a fixed amount, known as the range. In its most simple form, a noise gate allows a signal to pass through only when it is above a set threshold.

The gating may also be based on the presence of dialog in the audio input signal. Consequently, according to example embodiments, the loudness data represent values of a loudness function relating to such time segments of its audio input signal that represent dialog. According to other embodiments, the gating is based on a minimum loudness level. Such minimum loudness level may be an absolute threshold or a relative threshold. The relative threshold may be based on the loudness level measured with an absolute threshold.

According to example embodiments, the presentation data structure further comprises a reference to dynamic range compression, DRC, data for the referenced one or more content substreams, the method further including processing the decoded one or more content substreams or the output audio signal on the basis of the DRC data, wherein the processing comprises applying one or more DRC gains to the decoded one or more content substreams or the output audio signal.

Dynamic range compression reduces the volume of loud sounds or amplifies quiet sounds therefore narrowing or "compressing" an audio signal's dynamic range. By providing DRC data uniquely for each presentation, an improved user experience of the output audio signal may be achieved no matter what presentation that is chosen. Moreover, by providing DRC data for each presentation, a consistent user experience of the audio output signal over each of the plurality of presentations may be achieved and also between programs and across TV-cannels as described above.

DRC gains are always time variant. In each time segment, DRC gains may be a single gain for the audio output signal, or DRC gains differing per substream. DRC gains may apply to groups of channels and/or be frequency dependent. Additionally, DRC gains comprised in DRC data may represent DRC gains for two or more DRC time segments. E.g. sub-frames of a time-frame as defined by the encoder.

According to example embodiments, DRC data comprises at least one set of the one or more DRC gains. DRC data may thus comprise multiple DRC profiles corresponding to DRC modes, each providing different user experience of the audio output signal. By including the DRC gains directly in the DRC data, a reduced computational complexity of the decoder may be achieved.

According to example embodiments, the DRC data comprises at least one compression curve and wherein the one or more DRC gains are obtained by: calculating one or more loudness values of the one or more content substreams or the audio output signal using a predefined loudness function, and mapping the one or more loudness values to DRC gains using the compression curve. By providing compression curves in the DRC data and calculate the DRC gains based on those curves, the required bit rate for transmitting the DRC data to the encoder may be reduced. The predefined loudness function may for example be taken from the ITU-R BS.1770 recommendation documents, but any suitable loudness function may be used.

According to example embodiments, the mapping of the loudness values comprises a smoothing operation of the DRC gains. The effect of this may be a better perceived output audio signal. The time-constants for smoothing the DRC gains may be transmitted as part of the DRC data. Such time constants may be different depending on signal properties. For example, in some embodiments the time constant may be smaller when said loudness value is larger than the previous corresponding loudness value compared to when said loudness value is smaller than the previous corresponding loudness value.

According to example embodiments, said referenced DRC data are comprised in said the metadata substream. This may reduce the decoding complexity of the bitstream.

According to example embodiments, each of the decoded one or more content substreams comprises substream-level loudness data descriptive of a loudness level of the content substream, and wherein said processing the decoded one or more content substreams or the output audio signal further includes ensuring providing loudness consistency based on the loudness level of the content substream.

As used herein "loudness consistency" refers to that the loudness is consistent between different presentations, i.e. consistent over output audio signals formed on the basis of different content substreams. Moreover, the term refers to that the loudness is consistent between different programs, i.e. between completely different output audio signals such as an audio signal of a TV-show and an audio signal of a commercial. Furthermore, the term refers to that the loudness is consistent across different TV-channels.

Providing loudness data descriptive of a loudness level of the content substream may in some cases help the decoder to provide loudness consistency. For example, in the cases wherein said forming an output audio signal includes combining two or more decoded content substreams using alternative mixing coefficients and wherein the substream-level loudness data are used for compensating the loudness data for providing loudness consistency. These alternative mixing coefficients may be derived from user input, for example in the case a user decides to deviate from that default presentation (e.g. with dialog enhancement, dialog attenuation, Scene personalization, etc.). This may endanger the loudness compliance since the user influence may make the loudness of the audio output signal to fall outside compliance regulations. For aiding loudness consistency in those cases, the present embodiment provides the option to transmit substream-level loudness data.

According to some embodiments, the reference to at least one of said content substreams is a reference to at least one content substream group composed of one or more of the content substreams. This may reduce the complexity of the decoder since a plurality of presentations can share a content substream group (e.g. a substream group composed the content substream relating to music and the content substream relating to effects). This may also decrease the required bitrate for transmitting the bitstream.

According to some embodiments, the selected presentation data structure references, for a content substream group, a single mixing coefficient to be applied to each of said one or more of the content substreams from which the substream group is composed.

This may be advantageous in the case the mutual proportions of loudness level of the content substreams in a content substream group are ok, but the overall loudness level of the content substreams in the content substream group should be increased or decreased compared to other content substream(s) or content substream group(s) referenced by the selected presentation data structure.

According to some embodiments, the bitstream comprises a plurality of time frames, and wherein the data indicating the selected presentation data structure among the one or more presentation data structures are independently assignable for each time frame. Consequently, in the case a plurality of presentation data structures are received for a program, the selected presentation data structure may be changed, e.g. by the user, while the program is ongoing. Consequently, the present embodiment provides a more flexible way of selecting the content of the output audio while at the same time providing loudness consistency of the output audio signal.

According to some embodiments, the method further comprises: from the bitstream, and for a first of said plurality of time frames, extracting one or more presentation data structures, and from the bitstream, and for a second of said plurality of time frames, extracting one or more presentation data structures different said the one or more presentation data structures extracted from the first of said plurality of time frames, and wherein the data indicating the selected presentation data structure indicates a selected presentation data structure for the time frame for which it is assigned. Consequently, a plurality of presentation data structures may be received in the bitstream, wherein some of the presentation data structures relate to a first set of time frames, and some of the presentation data structures relate to second set of time frames. E.g. a commentary track may only be available for a certain time segment of the program. Moreover, the currently applicable presentation data structures at a specific point in time may be used for selecting a selected presentation data structure while the program is ongoing. Consequently, the present embodiment provides a more flexible way of selecting the content of the output audio while at the same time providing loudness consistency of the output audio signal.

According to some embodiments, out of the plurality of content substreams comprised in the bitstream, only the one or more content substreams referenced by the selected presentation data structure are decoded. This embodiment may provide an efficient decoder, with a reduced computational complexity.

According to some embodiments, the bitstream comprises two or more separate bitstreams, each comprising at least one of said plurality of content substreams, wherein the step of decoding the one or more content substreams referenced by the selected presentation data structure comprises: separately decoding, for each specific bitstream of the two or more separate bitstreams, the content substream(s) out of the referenced content substreams comprised in the specific bitstream. According to this embodiment, each separate bitstream may be received by a separate decoder which decodes the content substream(s) provided in the separate bitstream which is/are needed according to the selected presentation structure. This may improve the decoding speed since the separate decoders can work in parallel. Consequently, the decoding made by the separate decoders may at least partly overlap. However, it should be noted that the decoding made by the separate decoders need not to overlap.

Moreover, by dividing the content substreams into several bitstreams, the present embodiment allows for receiving the at least two separate bitstreams through different infrastructures as described below. Consequently, the present embodiment provides a more flexible method for receiving the plurality of content substreams at the decoder.

Each decoder may process the decoded substream(s) on the basis of the loudness data referenced by the selected presentation data structure, and/or apply DRC gains, and/or apply mixing coefficients to the decoded substream(s). The processed or unprocessed content substreams may then be provided from all of the at least two decoders to a mixing component for forming the output audio signal. Alternatively, the mixing component performs the loudness processing and/or applies the DRC gains and/or applies mixing coefficients. In some embodiments a first decoder may receive a first bitstream of the two or more separate bitstreams through a first infrastructure (e.g. cable TV broadcast) while a second decoder receives a second bitstream of the two or more separate bitstreams over a second infrastructure (e.g. over internet). According to some embodiments said one or more presentation data structures are present in all of the two or more separate bitstreams. In this case the presentation definition and loudness data is present in all separate decoders. This allows independent operation of the decoders until the mixing component. The references to substreams not present in the corresponding bitstream may be indicated as provided externally.

According to example embodiments, there is provided a decoder for processing a bitstream comprising a plurality of content substreams, each representing an audio signal, the decoder comprising: a receiving component configured for receiving the bitstream; a demultiplexer configured for extracting, from the bitstream, one or more presentation data structures, each comprising a reference to at least one of said content substreams and further comprising a reference to a metadata substream representing loudness data descriptive of the combination of the referenced one or more content substreams; a playback state component configured for receiving data indicating a selected presentation data structure among the one or more presentation data structures, and a desired loudness level; and a mixing component configured for decoding the one or more content substreams referenced by the selected presentation data structure, and for forming an output audio signal on the basis of the decoded content substreams, wherein the mixing component is further configured for processing the decoded one or more content substreams or the output audio signal to attain said desired loudness level on the basis of the loudness data reference by the selected presentation data structure.

II. Overview—Encoder

According to a second aspect, example embodiments propose encoding methods, encoders, and computer program products for encoding. The proposed methods, encoders and computer program products may generally have the same features and advantages. Generally, features of the second aspect may have the same advantages as corresponding features of the first aspect.

According to example embodiments, there is provided an audio encoding method, including: receiving a plurality of content substreams representing respective audio signals; defining one or more presentation data structures, each referring to at least one of said plurality of content substreams; for each of the one or more presentation data structures, applying a predefined loudness function to obtain loudness data descriptive of the combination of the referenced one or more content substreams, and including a reference to the loudness data from the presentation data structure; and forming a bitstream comprising said plurality of content substreams, said one or more presentation data structures and the loudness data referenced by the presentation data structures.

As described above, the term "content substream" encompasses substreams both within a bitstream and within an audio signal. An audio encoder typically receives audio signals which are then encoded into bitstreams. The audio signals may be grouped, wherein each group can be characterized as individual encoder input audio signals. Each group may then be encoded into a substream.

According to some embodiments, the method further comprises the steps of: for each of the one or more presentation data structures, determining dynamic range compression, DRC, data for the referenced one or more content substreams, wherein the DRC data quantifying at least one desired compression curve or at least one set of DRC gains, and including said DRC data in the bitstream.

According to some embodiments, the method further comprises the steps of: for each of the plurality of content substreams, applying the predefined loudness function to obtain substream-level loudness data of the content substream; and including said substream-level loudness data in the bitstream.

According to some embodiments, the predefined loudness function relates to the application of gating of the audio signal.

According to some embodiments, the predefined loudness function relates only to such time segments of the audio signal that represent dialog.

According to some embodiments, the predefined loudness function includes at least one of: frequency-dependent weighting of the audio signal, channel-dependent weighting of the audio signal, disregarding of segments of the audio signal with a signal power below a threshold value, computing an energy measure of the audio signal.

According to example embodiments, there is provided an audio encoder, comprising: a loudness component configured to apply a predefined loudness function to obtain loudness data descriptive of a combination of one or more content substreams representing respective audio signals; presentation data component configured to define one or more presentation data structures, each comprising a reference to one or more content substreams out of a plurality of content substreams and a reference to loudness data descriptive of a combination of the referenced content substreams; and a multiplexing component configured to form a bitstream comprising said plurality of content substreams, said one or more presentation data structures and the loudness data referenced by the presentation data structures.

III. Example Embodiments

FIG. 1 shows by way of example a generalized block diagram of a decoder 100 for processing a bitstream P and attaining a desired loudness level of an output audio signal 114.

The decoder 100 comprises a receiving component (not shown) configured for receiving the bitstream P comprising a plurality of content substreams, each representing an audio signal.

The decoder 100 further comprises a demultiplexer 102 configured for extracting, from the bitstream P, one or more presentation data structures 104. Each presentation data structure comprises a reference to at least one of said content substreams. In other words, a presentation data structure, or presentation, is a description of which content substreams are to be combined. As noted above, content substreams coded in two or more separate substreams may be combined into one presentation.

Each presentation data structure further comprise a reference to a metadata substream representing loudness data descriptive of the combination of the referenced one or more content substreams.

The content of a presentation data structure and its different references will now be described in conjunction with FIG. 4.

Figure 4:
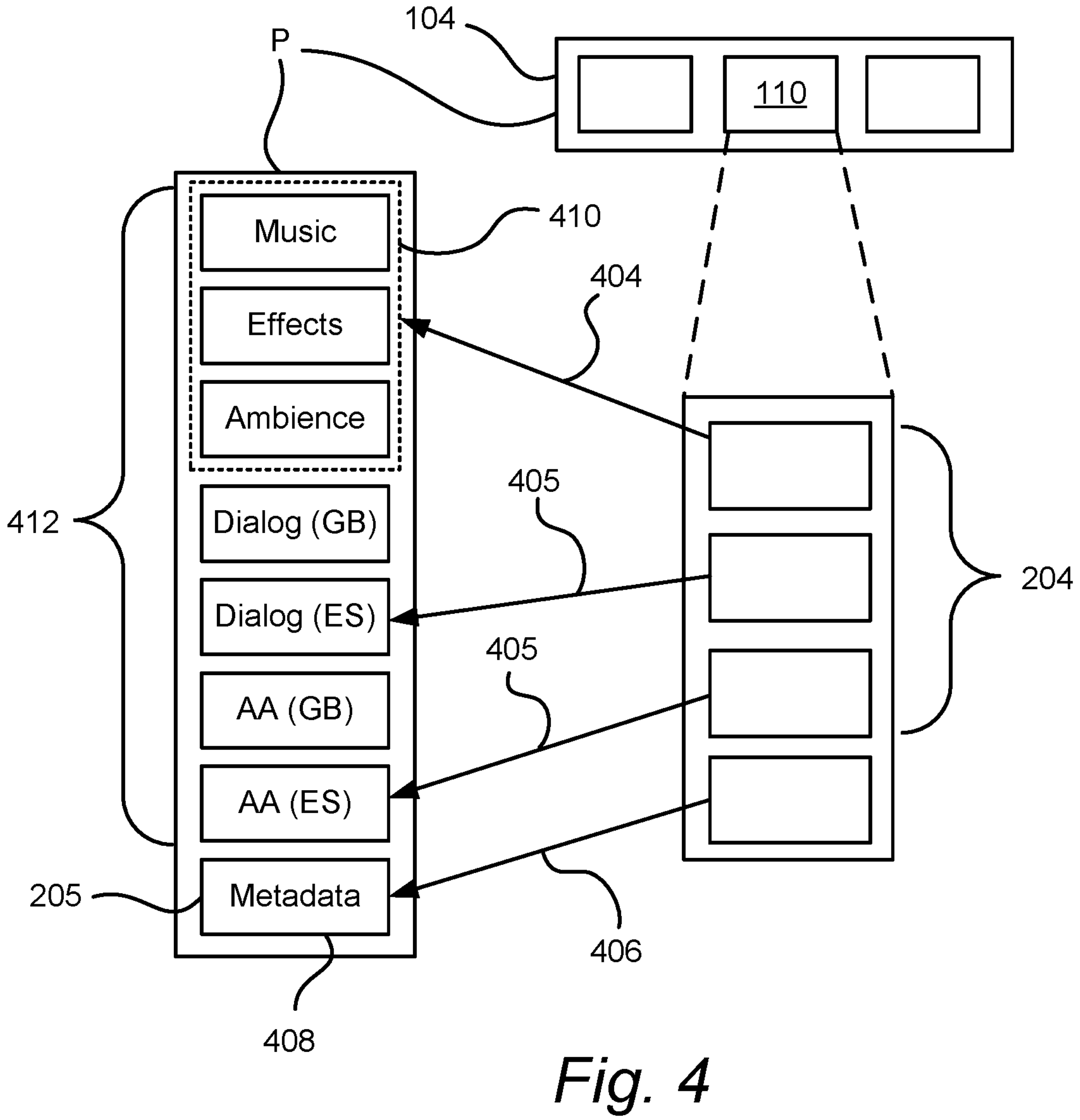
FIG. 4 describes a presentation data structure according to embodiments.

In FIG. 4, the different substreams 412, 205 which may be referenced by the extracted one or more presentation data structures 104 are shown. Out of the three presentation data structures 104, a selected presentation data structure 110 is chosen. As clear from FIG. 4, the bitstream P comprises the content substreams 412, the metadata substream 205 and the one or more presentation data structures 104. The content substreams 412 may for example comprise a substream for the music, a substream for the effects, a substream for the ambience, a substream for English dialog, a substream for Spanish dialog, a substream for associated audio (AA) in English, e.g. an English commentary track, and a substream for AA in Spanish, e.g. a Spanish commentary track.

In FIG. 4, all the content substreams 412 are coded in the same bitstream P, but as noted above, this is not always the case. Broadcasters of the audio content may use a single bitstream configuration, e.g. a single packet identifier (PID) configuration in the MPEG standard, or a multiple bitstream configuration, e.g. a dual-PID configuration, to transmit the audio content to their clients, i.e. to a decoder.

The present disclosure introduces an intermediate level in the form of substream groups which reside between the presentation layer and substream layer. Content substream groups may group or reference one or more content substreams. Presentations may then reference content substream groups. In FIG. 4, the content substreams music, effects and ambience are grouped to form a content substream group 410, which the selected presentation data structure 110 refers 404 to.

Content substream groups offer more flexibility in combining content substreams. In particular, the substream group level provides a means to collect or group several content substreams into a unique group, e.g., a content substream group 410 comprising music, effects and ambience.

This may be advantageous since a content substream group (e.g. for music and effects, or for music, effects and ambience) can be used for more than one presentation, e.g. in conjunction with an English or a Spanish dialog. Similarly, a content substream can also be used in more than one content substream groups.

Moreover, depending on the syntax of the presentation data structure, using content substream groups may provide possibilities to mix a larger number of content substreams for a presentation.

According to some embodiments, a presentation 104, 110 will always consist of one or more substream groups.

The selected presentation data structure 110 in FIG. 4 comprises a reference 404 to the content substream group 410 composed of one or more of the content substreams. The selected presentation data structure 110 further comprises a reference to a content substream for Spanish dialog and a reference to a content substream for AA in Spanish. Moreover, the selected presentation data structure 110 comprises a reference 406 to a metadata substream 205 representing loudness data 408 descriptive of the combination of the referenced one or more content substreams. Obviously, the other two presentation data structures of the plurality of presentation data structures 104 may comprise similar data as the selected presentation data structure 110. According to other embodiments, the bitstream P may comprise additional metadata substreams similar to the metadata substream 205, wherein these additional metadata substreams are referenced from the other presentation data structures. In other words, each presentation data structure of the plurality of presentation data structures 104 may reference a dedicated loudness data.

The selected presentation data structure may change over time, i.e. if the user decides to turn of the Spanish commentary track, AA (ES). In other words, the bitstream P comprises a plurality of time frames, and wherein the data (reference 108 in FIG. 1) indicating the selected presentation data structure among the one or more presentation data structures 104 are independently assignable for each time frame.

As described above, the bitstream P comprises a plurality of time frames. According to some embodiments, the one or more presentation data structures 104 may relate to different time segments of the bitstream P. In other words, the demultiplexer (reference 102 in FIG. 1) may be configured for extracting, from the bitstream P, and for a first of said plurality of time frames, one or more presentation data structures, and further configured for extracting, from the bitstream P, and for a second of said plurality of time frames, one or more presentation data structures different from said the one or more presentation data structures extracted from the first of said plurality of time frames. In this case, the data (reference 108 in FIG. 1) indicating the selected presentation data structure indicates a selected presentation data structure for the time frame for which it is assigned.

Now returning to FIG. 1, the decoder 100 further comprises a playback state component 106. The playback state component 106 is configured to receiving data 108 indicating a selected presentation data structure 110 among the one or more presentation data structures 104. The data 108 also comprises a desired loudness level. As described above, the data 108 may be provided by a consumer of the audio content that will be decoded by the decoder 100. The desired loudness value may also be a decoder specific setting, depending on the playback equipment which will be used for playback of the output audio signal. The consumer may for example choose that the audio content should comprise Spanish dialog as understood from above.

The decoder 100 further comprises a mixing component which receives the selected presentation data structure 110 from the playback state component 106 and decodes the one or more content substreams referenced by the selected presentation data structure 110 from the bitstream P. According to some embodiments, only the one or more content substreams referenced by the selected presentation data structure 110 are decoded by the mixing component. Consequently, in case the consumer has chosen a presentation with e.g. Spanish dialog, any content substream representing English dialog will not be decoded which reduces the computational complexity of the decoder 100.

The mixing component 112 is configured for forming an output audio signal 114 on the basis of the decoded content substreams.

Moreover, the mixing component 112 is configured for processing the decoded one or more content substreams or the output audio signal to attain said desired loudness level on the basis of the loudness data referenced by the selected presentation data structure 110.

Figure 2:
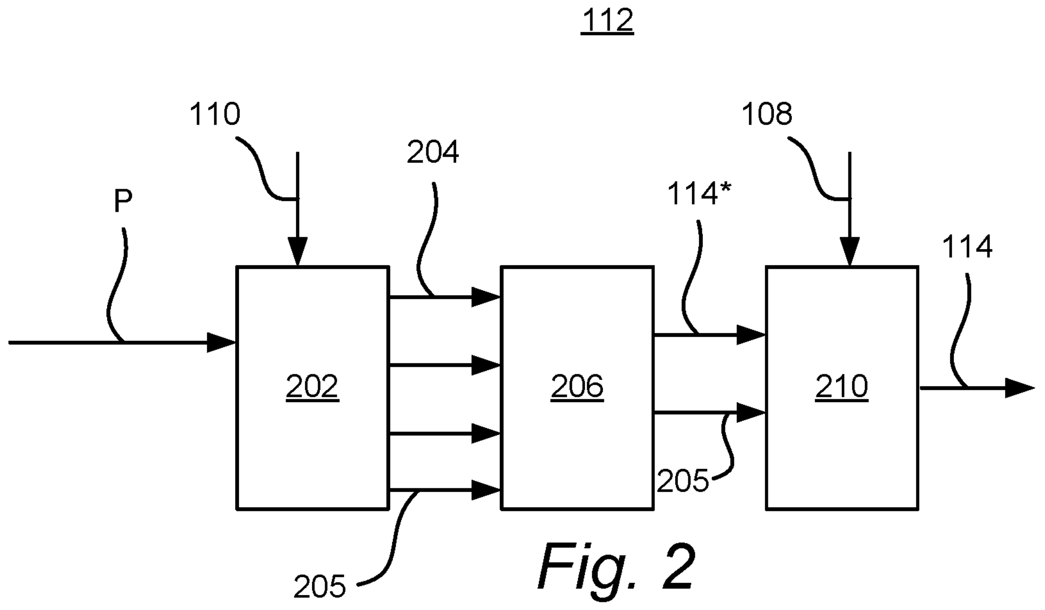
FIG. 2 is a generalized block diagram of a first embodiment of a mixing component of the decoder of FIG. 1.
Figure 3:
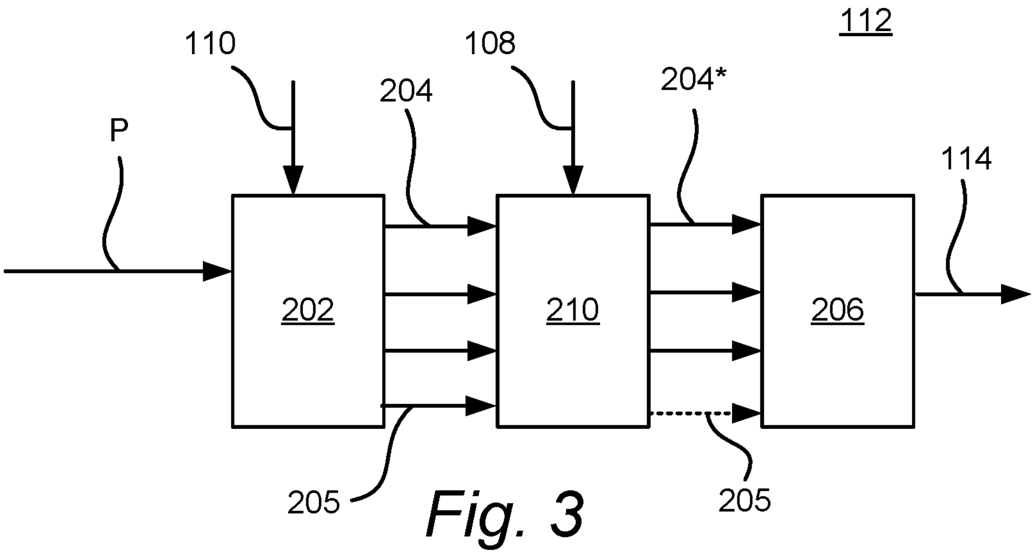
FIG. 3 is a generalized block diagram of a second embodiment of a mixing component of the decoder of FIG. 1.

FIGS. 2 and 3 describe different embodiments of the mixing component 112.

In FIG. 2, the bitstream P is received by a substream decoding component 202 which, based on the selected presentation data structure 110, decodes the one or more content substreams 204 referenced by the selected presentation data structure 110 from the bitstream P. The one or more decoded content substreams 204 are then transmitted to a component 206 for forming an output audio signal 114 on the basis of the decoded content substreams 204 and a metadata substream 205. The component 206 may for example take into account any time-dependent spatial position data included in the content substream(s) 204 when forming the audio output signal. The component 206 may further take into account DRC data comprised in the metadata substream 205. Alternatively, a loudness component 210 (described below) processes the output audio signal 114 on the basis of the DRC data. In some embodiments the component 206 receives mixing coefficients (described below) from the presentation data structure 110 (not shown in FIG. 2) and applies these to the corresponding content substreams 204. The output audio signal 114* is then transmitted to a loudness component 210 which, on the basis of loudness data (included in the metadata substream 205) referenced by the selected presentation data structure 110 and the desired loudness level comprised in the data 108, processes the output audio signal 114* to attain said desired loudness level and thus outputs a loudness processed output audio signal 114.

In FIG. 3, a similar mixing component 112 is shown. The difference from the mixing component 112 described in FIG. 2 is that the component 206 for forming an output audio signal and the loudness component 210 have changed positions with each other. Consequently, the loudness component 210 processes the decoded one or more content substreams 204 to attain said desired loudness level (on the basis of loudness data included in the metadata substream 205) and outputs one or more loudness processed content substreams 204*. These are then transmitted to the component 206 for forming an output audio signal which outputs the loudness processed output audio signal 114. As described in conjunction with FIG. 2, DRC data (included in the metadata substream 205) may be applied either in the component 206 or in the loudness component 210. Moreover, in some embodiments the component 206 receives mixing coefficients (described below) from the presentation data structure 110 (not shown in FIG. 3) and applies these to the corresponding content substreams 204*.

Each of the one or more presentation data structures 104 comprises dedicated loudness data that indicates exactly what the loudness of the content substreams referenced by the presentation data structure will be when decoded. The loudness data may for example represent the dialnorm value. According to some embodiments, the loudness data represent values of a loudness function applying gating to its audio input signal. This may improve the accuracy of the loudness data. For example, if the loudness data is based on a band-limiting loudness function, background noise of the audio input signal will not be taken into consideration when calculating the loudness data, since frequency bands that contain only static may be disregarded.

Moreover, the loudness data may represent values of a loudness function relating to such time segments of an audio input signal that represent dialog. This is in line with the ATSC A/85 standard where dialnorm is defined explicitly with respect to the loudness of the dialog (Anchor Element): "The value of the dialnorm parameter indicates the loudness of the Anchor Element of the content".

The processing of the decoded one or more content substreams or the output audio signal to attain said desired loudness level, ORL, on the basis of the loudness data referenced by the selected presentation data structure, or leveling, $g_L$, of the output audio signal may thus be performed by using the dialnorm of the presentation, DN(pres), calculated according to above:

$$g_L = ORL - DN(\text{pres}),$$

where DN(pres) and ORL typically are both values expressed in $dB_{FS}$ (dB with reference to a full-scale 1 kHz sine (or square) wave).

According to some embodiments, wherein the selected presentation data structure references two or more content substreams, the selected presentation data structure further references at least one mixing coefficient to be applied to the two or more content substreams. The mixing coefficient(s) may be used for providing a modified relative loudness level between the content substreams referenced by the selected presentation. These mixing coefficients may be applied as wideband gains to a channel/object in a content substream before mixing it with the channel/object in the other content substream(s).

At least one mixing coefficient is typically static but may be independently assignable for each time frame of a bitstream, e.g. to achieve ducking.

The mixing coefficients consequently do not need to be transmitted in the bit stream for each time frame; they can stay valid until overwritten.

The mixing coefficient may be defined per content substream. In other words, the selected presentation data structure may reference, for each substream of the two or more substreams, one mixing coefficient to be applied to the respective substreams.

According to other embodiments, the mixing coefficient may be defined per content substream group and be applied to all content substreams in the content substream group. In other words, the selected presentation data structure may reference, for a content substream group, a single mixing coefficient to be applied to each of said one or more of the content substreams from which the substream group is composed.

According to yet another embodiment, the selected presentation data structure may reference a single mixing coefficient to be applied to each of the two or more content substreams.

Table 1 below indicates an example of object transmission. Objects are clustered in categories which are distributed over several substreams. All presentation data structures combine the music and effects that contain the main part of the audio content without the dialog. This combination is thus a content substream group. Depending on the selected presentation data structure, a certain language is chosen, e.g. English (D #1) or Spanish D #2. Moreover, the content substream comprises one associated audio substream in English (Desc #1), and one associated audio substream in Spanish (Desc #2). The associated audio may comprise enhancement audio such as audio description, narrator for the hard of hearing, narrator for vision-impaired, commentary track etc.

TABLE 1

Examples of mixing coefficients

| | Substream groups | | | | | |
|---|---|---|---|---|---|---|
| | M & E | | D #1 | D #2 | Desc #1 | Desc #2 |
| | Substreams | | | | | |
| Presentation | Music | Effects | D #1 | D #2 | Desc #1 | Decs #2 |
| 1 | (0 dB) | (0 dB) | (0 dB) | — | — | — |
| 2 | (−3 dB) | (0 dB) | — | (0 dB) | — | |
| 3 | (−3 dB) | (0 dB) | — | (0 dB) | — | (−6 dB) |
| 4 | (−3 dB) | (−3 dB) | (−3 dB) | — | (0 dB) | — |

In presentation 1, no mixing gain via the mixing coefficients should be applied; presentation 1 thus references no mixing coefficients at al.

Cultural preferences may require different balances between the categories. This is exemplified in presentation 2. Consider the situation where the Spanish regions want less attention to the music. Therefore, the music substream is attenuated by 3 dB. In this example, presentation 2 references, for each substream of the two or more substreams, one mixing coefficient to be applied to the respective substreams.

Presentation 3 includes a Spanish description stream for vision-impaired. This stream was recorded in a booth and is too loud to be mixed straight into the presentation and is therefore attenuated by 6 dB. In this example, presentation 3 references, for each substream of the two or more substreams, one mixing coefficient to be applied to the respective substreams.

In presentation 4, both the music substream and the effects substream is attenuated by 3 dB. In this case, presentation 4 references, for the M&E substream group, a single mixing coefficient to be applied to each of said one or more of the content substreams from which the M&E substream group is composed.

According to some embodiments, the user or consumer of the audio content can provide user input such that the output audio signal deviates from the selected presentation data structure. For example, dialog enhancement or dialog attenuation may be requested by the user, or the user may want to perform some sort of scene personalization, e.g. increase the volume of the effects. In other words, alternative mixing coefficients may be provided which are used when combining two or more decoded content substreams for forming the output audio signal. This may influence the loudness level of the audio output signal. In order to provide loudness consistency in this case, each of the decoded one or more content substreams may comprise substream-level loudness data descriptive of a loudness level of the content substream. The substream-level loudness data may then be used for compensating the loudness data for providing loudness consistency.

The substream-level loudness data may be similar to the loudness data referenced by the presentation data structure, and may advantageously represent values of a loudness function, optionally with a larger range to cover the generally quieter signals in a content substream.

There are many ways to use this data to achieve loudness consistency. The below algorithms are shown by way of example.

Let DN(P) be the presentation dialnorm, and DN($S_i$) the substream loudness of substream i.

If a decoder is forming an audio output signal based on a presentation which references a music content substream, $S_M$, and an effects content substream, $S_E$, as one content substream group, $S_{M\&E}$, plus a dialog content substream, $S_D$, would like to keep consistent loudness while applying 9 dB of dialog enhancement, DE, the decoder could predict the new presentation loudness, DN($P_{DE}$), with DE by summing the content substream loudness values:

$$DN(P_{DE})=\log_{10}(10^{DN(S_{M\&E})}+10^{DN(S_D)+9})$$

As described above, performing such addition of substream loudnesses when approximating presentation loudness can result in a very different loudness then the actual loudness. Hence, an alternative is to calculate the approximation without DE, to find an offset from the actual loudness:

$$\text{offset}=DN(P)-\log_{10}(10^{DN(S_{M\&E})}+10^{DN(S_D)})$$

Since the gain on the DE is not a large modification of the program, in the way the different substream signals interact with each other, it is likely that the approximation of DN($P_{DE}$) is more accurate when using the offset to correct it:

$$DN(P_{DE})=\log_{10}(10^{DN(S_{M\&E})})+10^{DN(S_D)+9}))+\text{offset}$$

According to some embodiments, the presentation data structure further comprises a reference to dynamic range compression, DRC, data for the referenced one or more content substreams 204. This DRC data can be used for processing the decoded one or more content substreams 204 by applying one or more DRC gains to the decoded one or more content substreams 204 or the output audio signal 114. The one or more DRC gains may be included in the DRC data, or they can be calculated based on one or more compression curves comprised in the DRC data. In that case, the decoder 100 calculates a loudness value for each of the referenced one or more content substreams 204 or for the output audio signal 114 using a predefined loudness function and then uses the loudness value(s) for mapping to DRC gains using the compression curve(s). The mapping of the loudness values may comprise a smoothing operation of the DRC gains.

According to some embodiments, the DRC data of referenced by the presentation data structure corresponds to multiple DRC profiles. These DRC profiles are custom tailored to the particular audio signal to which they can be applied. The profiles may range from no compression ("None"), to fairly light compression (e.g. "Music Light") all the way to extremely aggressive compression (e.g. "Speech"). Consequently, the DRC data may comprise multiple sets of DRC gains, or multiple compression curves from which the multiple sets of DRC gains can be obtained.

The referenced DRC data may according to embodiments be comprised in the metadata substream 205 in FIG. 4.

It should be noted that the bitstream P may according to some embodiments comprise two or more separate bitstreams, and the content substreams may in this case be coded into different bitstreams. The one or more presentation data structures are in this case advantageously included in all of the separate bitstreams which means that several decoders, one for each separate bitstream, can work separately and totally independently to decode the content substreams referenced by the selected presentation data structure (also provided to each separate decoder). According to some embodiments, the decoders can work in parallel. Each separate decoder decodes the substreams that exist in the separate bitstream which it receives. According to embodiments, the each separate decoder performs the processing of the content substreams decoded by it, to attain the desired loudness level. The processed content substreams are then provided to a further mixing component which forms the output audio signal, with the desired loudness level.

According to other embodiments, each separate decoder provides its decoded, and unprocessed, substreams to the further mixing component which performs the loudness processing and then forms the output audio signal from all of the one or more content substreams referenced by the selected presentation data structure, or first mixes the one or more content substreams and performs the loudness processing on the mixed signal. According to other embodiments, each separate decoder performs a mixing operation on two or more of its decoded substreams. A further mixing component then mixes the pre-mixed contributions of the separate decoders.

Figure 5:
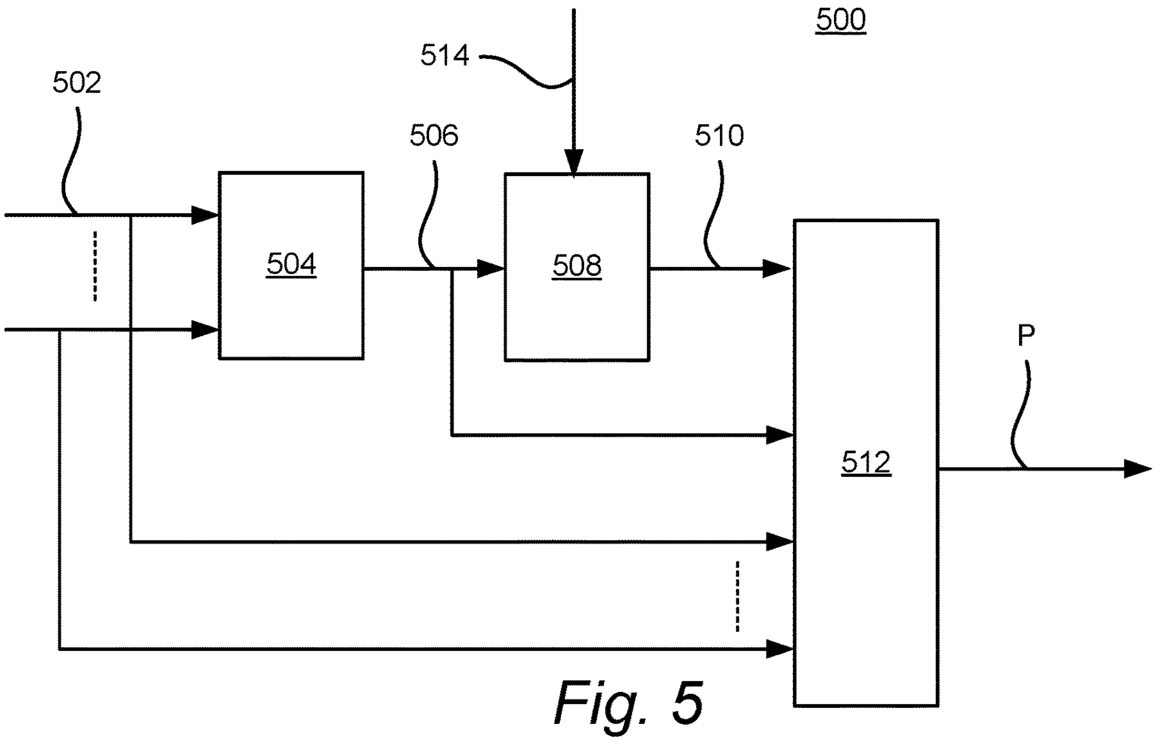
FIG. 5 shows a generalized block diagram of an audio encoder according to embodiments, and FIG. 6 describes a bitstream formed by the audio encoder of FIG. 5.
Figure 6:
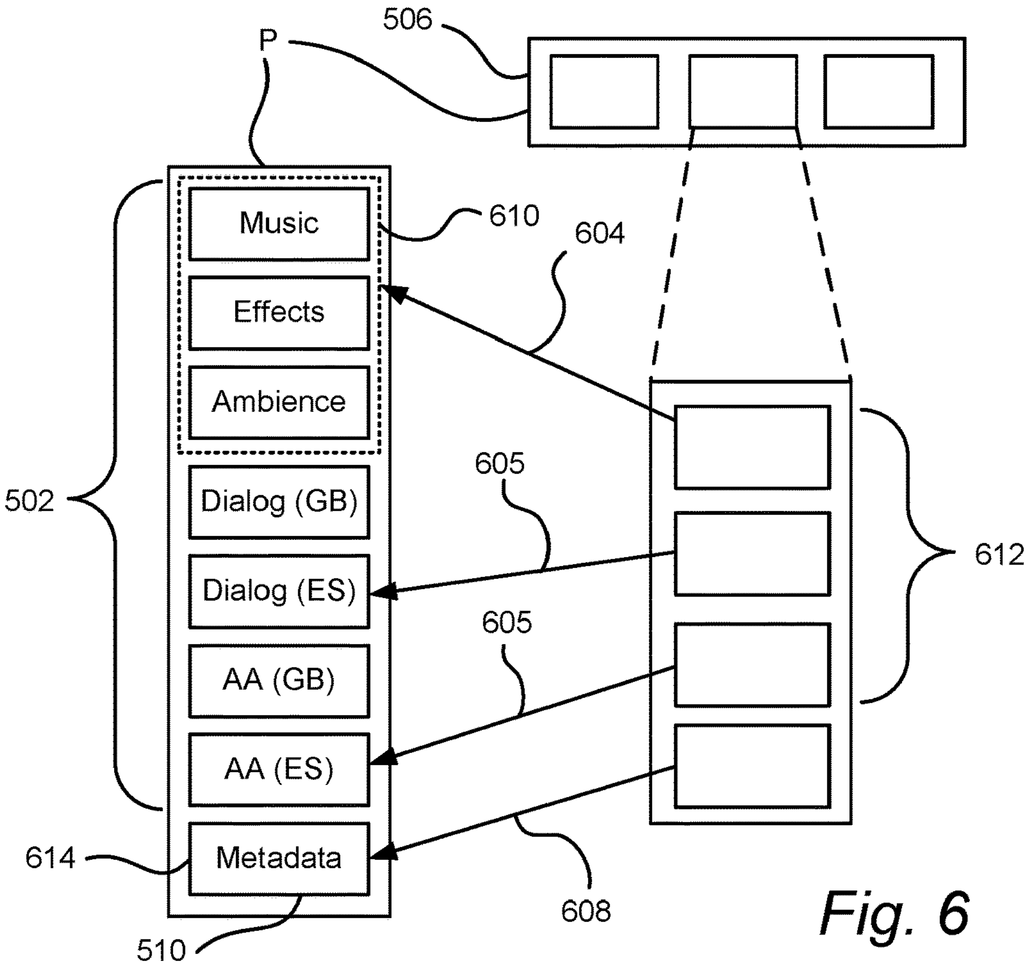

FIG. 5 in conjunction with FIG. 6 shows by way of example an audio encoder 500. The encoder 500 comprises a presentation data component 504 configured to define one or more presentation data structures 506, each comprising a reference 604, 605 to one or more content substreams 612 out of a plurality of content substreams 502 and a reference 608 to loudness data 510 descriptive of a combination of the referenced content substreams 612. The encoder 500 further comprises a loudness component 508 configured to apply a predefined loudness function 514 to obtain loudness data 510 descriptive of a combination of one or more content substreams representing respective audio signals. The encoder further comprises a multiplexing component 512 configured to form a bitstream P comprising said plurality of content substreams, said one or more presentation data structures 506 and the loudness data 510 referenced by said one or more presentation data structures 506. It should be noted that the loudness data 510 typically comprise several loudness data instances, one for each of said one or more presentation data structures 506.

The encoder 500 may further be adapted to for each of the one or more presentation data structures 506, determining dynamic range compression, DRC, data for the referenced one or more content substreams. The DRC data quantifies at least one desired compression curve or at least one set of DRC gains. The DRC data is included in the bitstream P. The DRC data and the loudness data 510 may according to embodiments be included in a metadata substream 614. As discussed above, loudness data is typically presentation dependent. Moreover, the DRC data may also be presentation dependent. In these cases, loudness data, and if applicable, DRC data for a specific presentation data structure are included in a dedicated metadata substream 614 for that specific presentation data structure.

The encoder may further be adapted to, for each of the plurality of content substreams 502, applying the predefined loudness function to obtain substream-level loudness data of the content substream; and including said substream-level loudness data in the bitstream. The predefined loudness function may relate to gating of the audio signal. According to other embodiments, the predefined loudness function relates only to such time segments of the audio signal that represent dialog. The predefined loudness function may according to some embodiments include at least one of:

- frequency-dependent weighting of the audio signal,
- channel-dependent weighting of the audio signal,
- disregarding of segments of the audio signal with a signal power below a threshold value,
- disregarding of segments of the audio signal that are not detected as being speech,
- computing an energy/power/root-mean-squared measure of the audio signal.

As understood from above, the loudness function is non-linear. This means that in case the loudness data were only calculated from the different content substreams, the loudness for a certain presentation could not be calculated by adding the loudness data of the referenced content substreams together. Moreover, when combining different audio tracks, i.e. content substreams, together for simultaneous playback, a combined effect between coherent/incoherent parts or in different frequency regions of the different audio tracks may appear which further makes addition of the loudness data for the audio track mathematically impossible.

IV. Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The devices and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method comprising:

obtaining, by a decoding device, an encoded bitstream;

extracting, by the decoding device, an audio signal and metadata from the encoded bitstream, the metadata including compression curve data and loudness data, wherein the loudness data indicates a loudness level of the audio signal;

generating, by the decoding device, one or more loudness values using the loudness data;

mapping, by the decoding device, the one or more loudness values to dynamic range compression (DRC) gains using the compression curve data; and applying, by the decoding device, the DRC gains to the audio signal.

2. The method of claim 1, wherein the audio signal includes at least a dialog content stream and a non-dialog content stream, and applying the DRC gains to the audio signal comprises:

applying the DRC gains to a time segment of the non-dialog content stream of the audio signal to increase a loudness of the dialog content stream.

3. The method of claim 1, wherein the DRC data applies to groups of channels.

4. The method of claim 3, wherein at least some of the loudness data is associated with a specific channel in the groups of channels.

5. The method of claim 1, wherein the DRC data comprises multiple DRC profiles corresponding to DRC modes, each DRC profile tailored to a particular audio signal to which the DRC gains can be applied.

6. The method of claim 1, wherein the loudness data comprises a loudness function that includes channel-dependent weighting of the audio signal.

7. The method of claim 1, wherein mapping the loudness values to the DRC gains includes disregarding segments of the audio signal that are not detected as being speech.

8. A decoding apparatus comprising:

one or more processors;

memory storing instructions, which when executed by the one or more processors, cause the one or more processors to perform operations comprising:

obtaining an encoded bitstream;

extracting an audio signal and metadata from the encoded bitstream, the metadata including compression curve data and loudness data, wherein the loudness data indicates a loudness level of the audio signal;

generating one or more loudness values using the loudness data;

mapping the one or more loudness values to dynamic range compression (DRC) gains using the compression curve data; and applying the DRC gains to the audio signal.

9. The decoding apparatus of claim 8, wherein the audio signal includes at least a dialog content stream and a non-dialog content stream, and applying the DRC gains to the audio signal comprises:

applying the DRC gains to a time segment of the non-dialog content stream of the audio signal to increase a loudness of the dialog content stream.

10. The decoding apparatus of claim 8, wherein the DRC data applies to groups of channels.

11. The decoding apparatus of claim 10, wherein at least some of the loudness data is associated with a specific channel in the groups of channels.

12. The decoding apparatus of claim 8, wherein the DRC data comprises multiple DRC profiles corresponding to DRC modes, each DRC profile tailored to a particular audio signal to which the DRC gains can be applied.

13. The decoding apparatus of claim 8, wherein the loudness data comprises a loudness function that includes channel-dependent weighting of the audio signal.

14. The decoding apparatus of claim 8, wherein mapping the loudness values to the DRC gains includes disregarding segments of the audio signal that are not detected as being speech.

15. A non-transitory, computer-readable storage medium having instructions stored thereon, which, when executed by one or more processors, cause the one or more processors to perform operations comprising:

obtaining an encoded bitstream;

extracting an audio signal and metadata from the encoded bitstream, the metadata including compression curve data and loudness data, wherein the loudness data indicates a loudness level of the audio signal;

generating one or more loudness values using the loudness data;

mapping the one or more loudness values to dynamic range compression (DRC) gains using the compression curve data; and applying the DRC gains to the audio signal.

* * * * *